Aug. 7, 1934.                L. L. LEECE                1,969,416
                              GEAR SHIFT
              Original Filed Sept. 25, 1930    2 Sheets-Sheet 1

Aug. 7, 1934.   L. L. LEECE   1,969,416
GEAR SHIFT
Original Filed Sept. 25, 1930   2 Sheets-Sheet 2
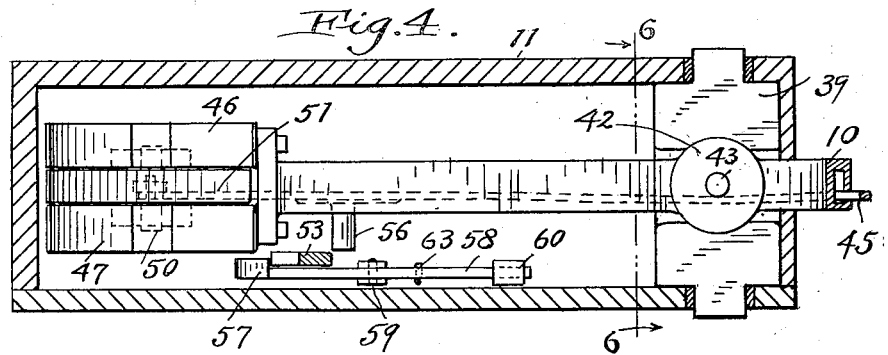
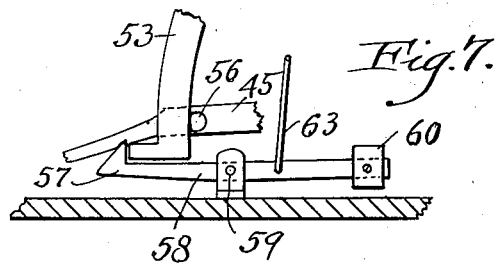
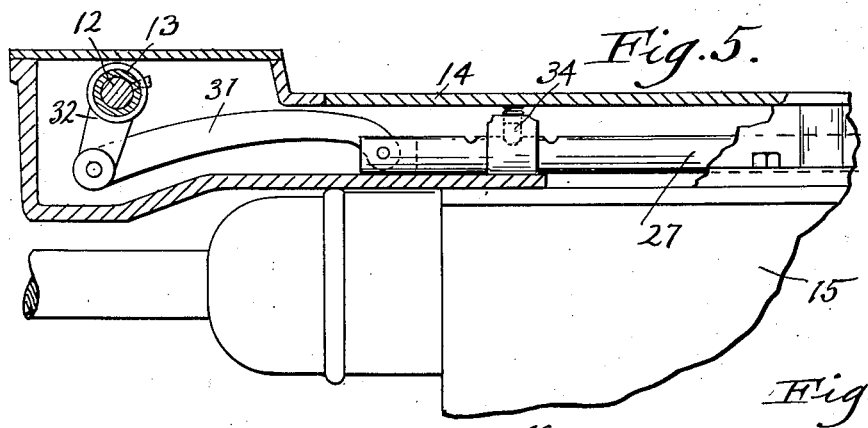
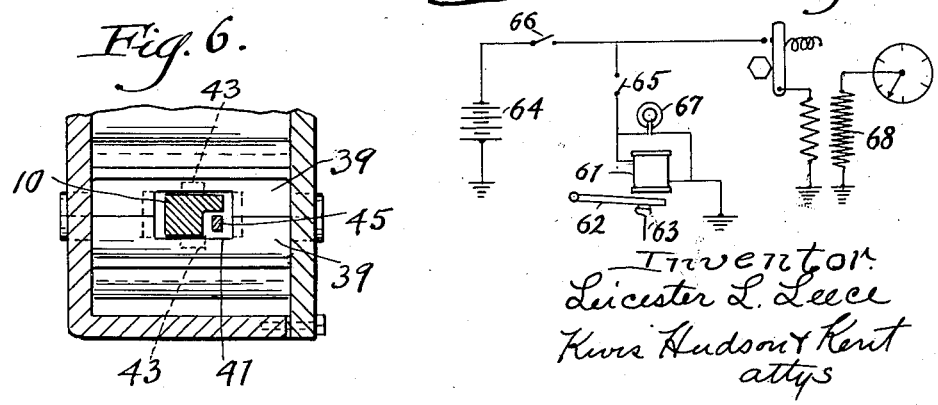

Patented Aug. 7, 1934

1,969,416

UNITED STATES PATENT OFFICE 1,969,416

GEAR SHIFT

Leicester L. Leece, Cleveland, Ohio

Application September 25, 1930, Serial No. 484,278
Renewed December 22, 1933

6 Claims. (Cl. 74—81)

This invention relates to improvements in gear shifts and has to do principally with mechanism for shifting gears by the operation of the clutch lever alone, thereby eliminating the usual hand shift lever. The present invention is in the nature of an improvement over the construction covered by my prior Patent No. 1,450,745 issued April 3, 1923.

One of the objects of the invention is the provision in apparatus of this kind of a foot lever capable of movement transversely for one purpose and longitudinally for another purpose.

Another object of the invention is the provision of a latch for preventing the accidental movement of the shifting mechanism to reverse gear position, and the provision of means independent of the shift lever for withdrawing this latch when reverse gear is to be purposely employed.

A further object is the provision of a signal for indicating to the operator that the latch is in the withdrawn position, so that he will not fail to reset the latch after the shift is completed.

Other objects and features of novelty will appear as I proceed with the description of that embodiment of the invention which, for the purposes of the present application, I have illustrated in the accompanying drawings, in which Figure 1 is an elevational view, partly in section, illustrating the operating lever and associated mechanism employed in connection with my gear shift.

Fig. 2 is a plan view with the tops of the casings removed, illustrating the operating mechanism and the gear shift mechanism proper as applied to an automobile transmission.

Fig. 3 is a detail, vertical, sectional view taken substantially on the line 3—3 of Fig. 2.

Fig. 4 is a longitudinal, sectional view taken substantially on the line 4—4 of Fig. 1.

Fig. 5 is a fragmental view of the transmission casing with a portion of the gear shift mechanism mounted thereon, the view being partially in section taken on the line 5—5 of Fig. 2.

Fig. 6 is a transverse, substantially vertical, sectional view on the line 6—6 of Fig. 4.

Fig. 7 is a fragmental, detail, elevational view showing a portion of the latch mechanism on a larger scale, and Fig. 8 is a diagram of the electrical connections.

The invention as illustrated herein comprises a foot lever 10 mounted in the forward end of a casing 11 containing certain operating mechanism, a pair of concentric shafts 12 and 13 mounted at one end in casing 11 and at the other end in a casing 14 which is secured to the top of the gear box 15 of the automobile, the casing 14 containing gear shifting elements. There is also a connection between the lever 10 and the clutch 16 of the automobile, such that the first movement of the lever 10 serves to release the clutch.

A pedal 17, having an integral arm 18 is pivotally mounted at 19 upon the lever 10, the arm 18 extending downwardly through that portion of the hollow lever which protrudes upwardly through the floor boards 20. The lever 10 is mounted to swing not only in the usual or longitudinal direction, but also transversely in a manner which resembles somewhat the transverse movement of the ordinary hand shift lever. The tilting of the pedal 17 corresponds in some respects to the forward and rearward movement of the ordinary hand shift lever, but this tilting does not actually shift the gears. It merely sets the mechanism, so that when the lever 10 is depressed sufficiently the shift will be effected in the desired manner.

Referring to the drawings now somewhat more in detail, 21 is a horizontal clutch shifting lever pivoted to the clutch casing at 22 and connected at its outer end to a link 23 which is pivotally anchored in one of the series of holes 24 in an arm 25 fixed to and depending from the lever 10. The lever 21 is normally held in clutch engaging position by a spring 26, indicated diagrammatically in Fig. 2.

In the casing 14 there are slidably mounted a pair of gear shift rods 27 and 28 to which are secured yokes 29 and 30, respectively, that engage grooves in the collars attached to the movable gear members of the transmission. The movement of one of these yokes effects the gear shift between low and reverse positions and the other that between second speed and high speed positions. To the rear ends of the rods 27 and 28 are pivotally connected links 31 and 32 which, in turn, are pivotally connected with the lower ends of crank arms 32 and 33. The crank arm 33 is pinned to shaft 12, while arm 32 is pinned to the hollow shaft or sleeve 13 which surrounds shaft 12. When either of the shafts 12 or 13 is oscillated the corresponding rod 27 or 28 is moved longitudinally. Each of these rods is releasably held in any one of its three positions by a spring detent 34 that is adapted to take into one of the notches 35 in the upper side of the rod.

In the casing 11 the shafts 12 and 13 carry depending crank arms 36 and 37, respectively, the lower ends of which are preferably provided with anti-friction rollers 38. The crank arms 36 and 37 stand normally in the position illustrated in full lines in Fig. 1. The positions of the anti-friction rollers 38 corresponding to the gear engaging positions of the gear shift are indicated in the same figure in dotted lines at A and B.

In the forward end of the casing 11 there is a pair of semi-cylindrical trunnion blocks 39 which have central extensions that are rotatably mounted in the casing 11. They are held in proper position relative to each other by their mounting in the bearings. The adjacent faces of the blocks 39 are recessed, as indicated at 41, and the lever 10 projects through the opening provided thereby. Midway of its length this opening is enlarged to provide a bearing for a flat circular enlargement 42 of the lever, which is concentric with approximately vertical top and bottom trunnions 43 which project into openings in the blocks 39 formed to receive them.

That portion of the lever 10 which is beneath the floor boards 20 is hollow throughout the greater part of its length and contains a longitudinally movable rod 45 which is pivotally connected to the lower end of the pedal arm 18. Where the lever 10 passes through the blocks 39 it may be merely recessed, as indicated in Fig. 6, for the accommodation of the rod 45.

The rear end of the lever 10 supports a pair of spaced upstanding cam plates 46 and 47, which are located normally directly below the crank arms 36 and 37. The cam plates 46 and 47 are duplicates. They are each provided with double cam surfaces which diverge upwardly, and which merge into a groove 48 at their lower ends. The groove 48 extends substantially along an arc struck from the axis of the trunnion blocks 39. It will be apparent that when one or the other of the anti-friction rollers 38 is in one of the dotted line positions of Fig. 1, the depression of the forward end of lever 10 will cause the corresponding cam surface of the lever 46 or 47, as the case may be, to shift such anti-friction wheel to its full line, or neutral, position.

Depending from the cam plates 46 and 47 are lips 49 in which is mounted a pivot pin 50 that supports an intermediate cam plate 51. This cam plate is shaped like a spear head, that is it has cam surfaces on its upper edges which converge toward the top. Depending below the pivot pin 50 there is an extension of the cam plate 51 to which is pivotally connected at 52 the rear end of the rod 45, this rod being deflected downwardly behind the trunnion blocks 39. By tilting the pedal 17 forward or backward the rod 45 is caused to move longitudinally and to shift the cam plate 51 from a forward to a backward position, or vice versa. Gravity tends to maintain it in either of these two positions. When the lever 10 is in its intermediate position transversely it may be swung longitudinally without causing the cam plate 51 to contact with either one of the rollers 38, that is the cam plate 51 moves upwardly between these rollers. However if the lever 10 is swung to the right or to the left and then swung longitudinally the cam plate 51 will engage one or the other of the rollers 38 and will shift it to a dotted line position.

In connection with my invention I prefer to employ a latch which is so constructed and arranged as to prevent accidental shifting of the gears to the reverse position. This device is not essential to my invention in some of its broader aspects, nor is its application limited to a gear shift mechanism of the character herein disclosed. In its present embodiment it consists of a lever 53 pivotally mounted at 54 to any suitable bracket on the casing 11, and held normally in the position indicated in Fig. 1 by means of the coil spring 55. The rod 45 carries an outwardly extending lug 56 which is adapted to clear the lever 53 when the lever 10 is in normal position, or when it is moved transversely to the second speed and high position. When the lever 10 is moved transversely to the low speed and reverse side however, the lug 56 stands behind the lever 53. The latter lever is prevented from swinging rearwardly by a latch 57 on the rear end of a lever 58 which is pivoted at 59 to a bracket on the bottom of casing 11, and which is held normally in the latching position by a weight 60. If it is the driver's intention to operate the shift mechanism to reverse gear position, he must use manual means for withdrawing the latch 57, after which the rod 45 may be moved toward the rear, swinging the lever 53 against the slight tension of spring 55.

While various means may be employed for withdrawing the latch 57, I prefer to utilize electrical means comprising an electromagnet 61 supported within the casing 11, and serving when energized to elevate its armature 62 and thereby a pull rod 63 which is pivotally connected with the lever 58 forward of its fulcrum 59. As indicated in Fig. 8, the electromagnet 61 may be arranged in a circuit with the starting and lighting battery 64 through a control switch 65. The arrangement is preferably such, however, that the closing of switch 65 will be ineffective unless the ignition switch 66 is closed. I prefer also to locate a signal lamp 67 in a shunt across this circuit. The lamp 67 is mounted upon the instrument board of the automobile. The ignition coil and related elements are indicated generally at 68. So long as the switches 65 and 66 remain closed the lamp 67 is illuminated. Hence it serves to remind the driver to open the switch 65 again and thereby reset the latch 57 after the shift into reverse gear is effected, and if he fails to do so in spite of the signal the current through coil 61 and lamp 67 will be interrupted when the ignition is turned off.

*Operation.*—When the transmission is in the neutral position, both of the crank arms 36 and 37 stand in the full line position of Fig. 1. Assuming that the operator desires to shift to first speed, he tilts the pedal 17 rearwardly and exerts pressure sidewise to swing the upper end of the lever around the trunnions 43 toward the left. The forward end of the lever is then depressed, pulling upon the link 23 to release the clutch. Continued depression of the lever causes the forward edge of cam plate 51 to engage the roller 38 on crank arm 37, swinging that roller to the dotted line position A in Fig. 1. The lever 10 is then permitted to rise again to normal position. Now should it be desired to shift from first speed to second speed, the pedal 17 is tilted forward bringing the rear edge of cam plate 51 to the upper side, the lever is swung transversely toward the right about the trunnions 43, bringing the cam plate 51 underneath the crank arm 36. Then, when the lever as a whole is depressed, the roller 38 on the bottom of crank arm 36 is swung to the dotted line position B of Fig. 1, thereby effecting the shift into second speed. At the same time the forward cam surface on cam plate 47 engages the roller on the lower end of crank arm 37 and shifts it from the dotted line position A back to the full line position, thereby disengaging the first speed gears. The lever is then permitted to rise again to its normal position, after which the pedal 17 may be rocked rearwardly, and the lever 10 depressed to cause cam plate 51 to shift the roller 38 on crank arm 36 from the B position to the A position, thereby disengaging the second speed gears and throwing the gearing into "high." When the driver of the car desires to use reverse gear he first closes switch 65 and then tilts pedal 17 forwardly, swings the forward end of lever 10 toward the left and depresses the lever. As soon as the lever 10 is again permitted to rise the switch 65 may be opened so as to reset the latch 57.

It is not intended that the operator in releasing the clutch for purposes other than gear shifting shall depress the foot lever further than is necessary for this operation, but when the transverse position of the lever and the adjustment of the pedal 17 are permitted to remain in the setting for the last shift, clutch releasing pressure on the lever may be as heavy as desired without affecting the gear shift.

While in the foregoing description and in the accompanying drawings I have disclosed one particular embodiment of my invention more or less in detail, I desire it to be understood that such detail disclosure has been resorted to primarily for the purpose of fully illustrating the invention to comply with the requirements of the statute, and that such detail disclosure is not to be construed as amounting to a limitation upon the scope of the claims.

Having thus described my invention, I claim:

1. In gear shifting mechanism, a foot lever movable laterally and longitudinally about a given center in each of two planes at right angles to each other, a tiltable pedal mounted on the upper end of said lever, and operating connections adapted to be actuated by the tilting of said pedal for prearranging an element of the shifting mechanism located on the opposite side of said center so as to enable the said mechanism to perform a predetermined operation when the lever is moved longitudinally.

2. In gear shifting mechanism, a foot lever movable laterally and longitudinally about a given point, a tiltable pedal mounted on one end of said lever, a double cam plate movably mounted on the other end of said lever, operating connections between said pedal and cam plate, whereby the cam plate may be shifted to a predetermined position so as to perform a predetermined operation when the lever is moved longitudinally.

3. In a gear shifting mechanism, a lever, a cam fixed upon said lever, a second cam parallel with said first named cam movably mounted on said lever to take any one of a plurality of different positions, and a shifting arm mounted above said cams, said lever being movable sidewise to bring either one of said first named cams into position beneath said arm, and lengthwise, whereby the cam selected may be brought into engagement with said arm to shift the latter.

4. In a gear shifting mechanism, a lever, a pair of spaced cam plates fixed upon said lever, each of said plates having upwardly diverging cam surfaces, a middle cam plate interposed between said fixed cam plates and provided with upwardly converging cam surfaces, said middle plate being movable to shift its apex to either forward or back position, a pair of shifter arms spaced apart approximately the same distance as said fixed cams, said fixed cams standing normally below said arms and said lever being movable laterally to bring said middle cam plate underneath either of said arms and one of the fixed cam plates underneath the remaining arm.

5. In a foot controlled gear shift for motor vehicles, a foot lever mounted to swing laterally and to swing longitudinally when in any one of a plurality of lateral positions, a foot pedal carried by said foot lever, a pair of gear shifters, devices carried by the lever and operable when the lever is moved longitudinally to move either one or both of said gear shifters to neutral position, depending upon the lateral position of the lever, and a further device movably mounted on the lever and operably connected with said foot pedal and operative when the lever is moved longitudinally for moving either of said gear shifters in either of two directions, depending upon the lateral position of the lever and upon the foot pedal position.

6. In a foot control for motor vehicles, a foot lever having a lateral as well as a longitudinal swinging movement, a pedal carried by said lever and tiltable forward and backward thereupon, a pair of gear shifters with portions thereof arranged side by side and movable in either direction to and from neutral position, and means operatively associated with the lever and pedal for selectively shifting said gear shifters one to a gear shifting position from neutral position and the other back to neutral position, the lateral position of said lever determining which shifter shall be engaged by the lever to be moved to a gear engaging position and the forward or backward position of the pedal determining the direction of movement of that shifter, and the operation of the shifters being accomplished by the longitudinal swinging of the lever.

LEICESTER L. LEECE.